United States Patent [19]

Cook et al.

[11] Patent Number: 4,746,041
[45] Date of Patent: May 24, 1988

[54] ALL PURPOSE CONVERTIBLE RACK

[75] Inventors: Lynn R. Cook, 6001 Kent Rd., Fort Wayne, Ind. 46816; John W. Waltemath, Fort Wayne, Ind.

[73] Assignee: Lynn R. Cook, Fort Wayne, Ind.

[21] Appl. No.: 7,098

[22] Filed: Jan. 27, 1987

[51] Int. Cl.⁴ .............................................. B60R 7/00
[52] U.S. Cl. ................................ 224/42.42; 224/273; 211/104
[58] Field of Search ............................ 224/42.42, 273; 248/95–101; 108/44, 29, 11, 12, 16; 220/6, 19; 211/49.1, 86, 104, 2, 43, 195, 201; 296/37.5, 37.8

[56] References Cited

U.S. PATENT DOCUMENTS

| 732,037 | 6/1903 | Best ................................. 211/195 X |
| 1,714,629 | 5/1929 | Rodin ................................. 211/195 |
| 2,061,937 | 11/1936 | Fay ................................... 211/49.1 |
| 2,351,679 | 6/1944 | Harris . |
| 2,461,374 | 2/1949 | Custer ............................. 211/49.1 X |
| 2,571,037 | 10/1951 | Hoffman ......................... 135/108 X |
| 2,597,788 | 5/1952 | Gleasman ......................... 211/195 |
| 2,665,010 | 1/1954 | Sooter . |
| 2,916,153 | 12/1959 | Saul, Jr. ........................... 211/49.1 |
| 2,959,293 | 11/1960 | Von Meyer .................... 211/43 X |
| 3,021,011 | 2/1962 | Visneski ........................... 211/49.1 |
| 3,174,493 | 3/1965 | Gruenberg .................... 135/108 X |
| 3,389,805 | 6/1968 | Yeomans . |
| 3,422,565 | 1/1969 | Kentfield et al. . |
| 3,963,037 | 6/1976 | Clark ................................. 135/65 |
| 3,999,734 | 12/1976 | Gibson et al. ................. 211/2 X |
| 4,029,244 | 6/1977 | Roberts . |
| 4,135,626 | 1/1979 | Cawood . |
| 4,174,085 | 11/1979 | Ferreira et al. ................ 108/11 X |
| 4,189,056 | 2/1980 | Majewski . |
| 4,226,348 | 10/1980 | Dottor et al. . |
| 4,305,519 | 12/1981 | Gerich . |
| 4,372,512 | 2/1983 | Wolfe . |

FOREIGN PATENT DOCUMENTS

627398  8/1949  United Kingdom ................ 211/43

Primary Examiner—Henry J. Recla
Assistant Examiner—Robert Petrik
Attorney, Agent, or Firm—Jeffers, Hoffman & Niewyk

[57] ABSTRACT

An all-purpose portable rack includes a pair of mated opposite end parts each being composed of separate base and upright hollow tubular members having portions which form a plurality of slidable and pivotable joints coupling the respective end parts and members of each end part together in mated relationships so as to define an article holding region. The rack also includes an endless elongated elastic member extending about an endless path within the hollow interior of the mated tubular members of the mated rack end parts so as to resiliently retain the parts interconnected together while allowing the members to slide and pivot relative to one another at their mated joints for expanding and contracting the article holding region of the rack and converting the rack to any one of a plurality of upright and inverted operative configurations. In the respective operative configurations, the rack is adapted to hold, in a generally upright disposition, different types of articles having diverse structures and shapes. The rack can also be converted to a folded inoperative configuration for storing when not in use.

21 Claims, 6 Drawing Sheets

ALL PURPOSE CONVERTIBLE RACK

BACKGROUND OF THE INVENTION

The present invention generally relates to portable structures for supporting articles in an upright fashion and, more particularly, is concerned with an all-purpose rack capable of being converted to a plurality of different configurations adapting the rack for use in a variety of different applications.

DESCRIPTION OF THE PRIOR ART

Portable structures of various constructions adapted specifically to support particular kinds of articles in an upright fashion are widely known in the prior art. Some of such structures can be adjusted to hold articles of various sizes and in various numbers. For example, U.S. Pat. Nos. to Sooter (2,665,010), Yeomans (3,389,805) and Cawood (4,135,626) disclose different versions of self-adjusting expandable and retractable book ends adapted to hold different numbers of books. Other of such structures can be erected to place them in use and then collapsed or folded for storing during periods of nonuse. For instance, U.S. Pat. Nos. to Roberts (4,029,244), Dottor et al (4,226,348), Majewski (4,189,056), Gerich (4,305,519) and Wolfe (4,372,512) disclose different collapsible stands, holders or racks being erectible for holding bags of groceries and containers of beverages within the trunk of a vehicle.

One common shortcoming of all the above-noted structures is that they are each designed to serve a special purpose or use. Each structure has only a single operative configuration and can thus only hold a specific type or class of articles. In addition to limited utility and versatility, all of these structures appear to be constructed of a large number of parts. These factors would likely make them costly to fabricate and assemble.

Consequently, a need exists for a fresh approach to designing a portable structure for holding articles upright. The structure should be versatile in terms of its ability to be used to hold many different types of articles upright without at the same time necessitating an increase in the complexity of its construction over those of the structures known heretofore.

SUMMARY OF THE INVENTION

The present invention provides an all-purpose rack designed to satisfy the aforementioned needs. The rack of the present invention is composed of a simple arrangement of generally vertical and horizontal hollow tubular members coupled together by slidable and pivotable joints and an endless elongate elastic member which runs through the hollow tubular members to retain them together. The rack can be converted to any one of a plurality of different operative configurations adapting the rack for use in different applications with different types of articles.

By way of example, in an upright nonskewed retracted or expanded configuration, the all-purpose rack can hold one or more bags of groceries or cartons of beverages, or a row of books; in another upright skewed retracted configuration, the rack can accommodate a thin briefcase; in an inverted nonskewed retracted configuration, the rack can support a loudspeaker; and in another inverted nonskewed retraced configuration, it can align a plurality of file folders. Finally, the rack can also be converted to a folded inoperative configuration adapting it to occupy only a minimum amount of storage space.

Accordingly, the present invention is directed to an all-purpose rack for holding different types of articles which includes at least a pair of mated opposite end parts each being composed of separate hollow tubular members, being preferably generally vertically and horizontally arranged, which have portions forming a plurality of slidable and pivotable joints coupling the respective end parts and the members of each end part together in mated relationships so as to define an article holding region. The rack further includes an endless elongate elastic member extending along an endless path within the hollow interior of the mated tubular members of the rack end parts so as to resiliently retain the parts interconnected together while allowing the members to slide and pivot relative to one another at their mated joints for expanding and contracting the article holding region of the rack and converting the rack to any one of a plurality of operative configurations.

More particularly, each end part of the rack is composed of a pair of tubular base members and a tubular upright member supported on the base members intermediate their respective opposite ends so as to dispose the base members in laterally spaced apart relationship. Each of the base members has a generally linear tubular shape, whereas the upright member is also tubular but generally inverted U-shaped. The upright member is composed of a tubular end portion and a pair of tubular side portions integrally connected to, and extending generally parallel to one another in the same direction from, the respective opposite ends of the end portion. The plurality of rack joints formed by the mated tubular member portions and held together by the endless elastic member are telescopable slip joints which allow both relative pivoting and sliding movement between the members.

The members of each rack end part so coupled together adapt the rack to be convertible to any one of a plurality of different operative configurations for holding articles having diverse structures and shapes. One operative configuration of the rack is an upright nonskewed retracted or expanded configuration. Another is an upright skewed retracted configuration. Still another is an inverted nonskewed retracted configuration. Yet another is a modified inverted nonskewed retracted configuration. In the upright operative configurations of the rack, its end parts are disposed in a side-by-side tandem arrangement with their respective upright members extending in the same direction relative to their base members. On the other hand, in the inverted operative configurations of the rack, its end parts are again disposed in a side-by-side tandem arrangement but now with their respective upright members extending in opposite directions relative to their base members.

The present invention is also directed to the method of converting the rack from its upright to inverted operative configuration. In the method of converting the rack, its respective end parts are first moved from an upright nonskewed to upright skewed condition. Next, from the upright skewed condition, the end parts are moved to a flattened condition where they both lie in a common plane. Finally, the end parts are moved from the flattened coplanar to nonskewed inverted condition. In each step of the converting method, respective members of each rack end part pivotally move relative to one another through an arcuate path of approximately ninety degrees. The flattened coplanar condition of the end parts at the intermediate step of the converting method represents a folded inoperative configuration of the rack.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
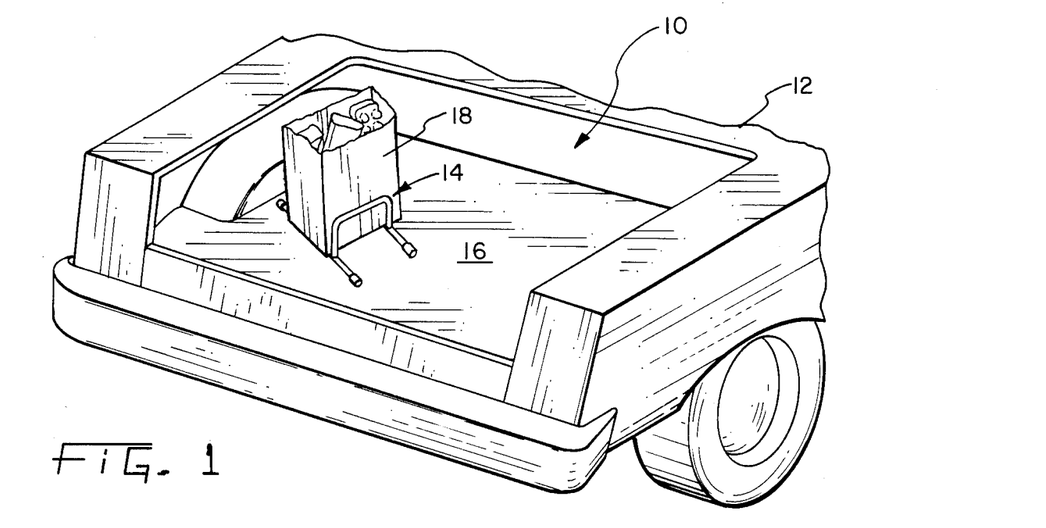
FIG. 1 is a fragmentary perspective view of an open truck compartment of a vehicle illustrating one application of the all-purpose rack of the present invention in which it is disposed on the trunk compartment floor and supports a bag of groceries in an upright position between its mated opposite end parts which are disposed in an upright nonskewed configuration.

Referring now to the drawings, and particularly to FIG. 1, there is shown an open trunk compartment 10 of a vehicle 12 in which is located an all-purpose portable rack 14 being constructed in accordance with the principles of the present invention. The rack 14 is shown disposed on the compartment floor 16 in an operative configuration which adapts it to hold one or more bags 18 of groceries upright within the trunk compartment while the groceries are being transported in the vehicle.

Turning now to FIGS. 2-5, basically, the all-purpose rack 14 includes a pair of mated opposite end parts 20, 22 and an endless elongate elastic member 24. The mated end parts 20 and 22 of the rack 14 are composed of respective pairs of tubular base members 26, 28 and 30, 32 and tubular upright members 34 and 36. The end part members can be composed of lightweight metal tubing, such as fabricated from aluminum, although tubing fabricated from other suitable materials, such as plastics, can be used. The endless elastic member 24 can be a strand of fabric covered elastic cord commonly known as a "bungee cord" or a "shock cord", and having its opposite ends 33 and 37 connected together by a crimp tube connector 35 (FIG. 3A). Elastic cord 24 is under tension, for example, approximately twelve ounces of tension, to maintain all parts of the rack assembly together when in their natural state.

More particularly, each of the base members 26-32 has a generally linear tubular shape and one of a plurality of short tubes 38-44 fixed thereon in upstanding fashion and located intermediate of the opposite ends of the base members. The upright members 34, 36 are preferably generally inverted U-shaped, although other shapes are possible, and slidably fit telescopably at their lower opposite ends over the respective short tubes 38-44. In such manner, the upright members 34 and 36 are supported on the base members 26, 28 and 30, 32 so as to extend in generally orthogonal relationship thereto and, in turn, dispose the respective pairs of base members of the end parts 20, 22 in laterally spaced apart relationship. Each upright member 34 and 36 is composed of a tubular upper end portion 46 and 48 and a pair of tubular side portions 50, 52 and 54, 56 integrally connected to, and extending generally parallel to one another downwardly from, the respective opposite ends of the upper end portions 46 and 48.

Figure 2:
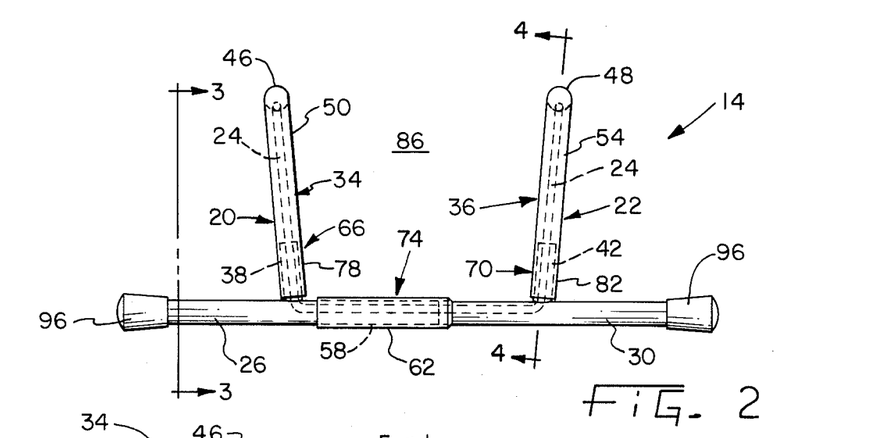
FIG. 2 is an enlarged side elevational view of the rack illustrating its mated opposite end parts in a retracted upright nonskewed configuration and in dashed outline form an endless elongate elastic member contained within the mated hollow tubular members of the rack end parts.
Figure 3:
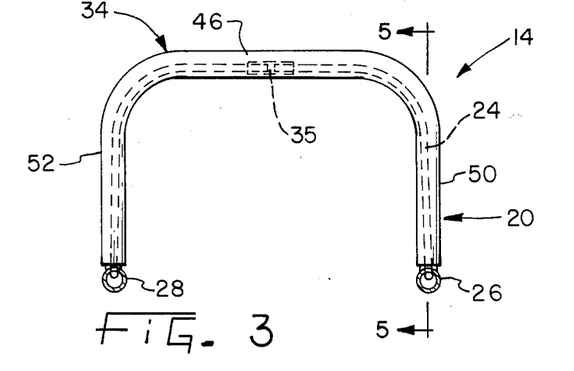
FIG. 3 is an end elevational view of the rack as seen along line 3—3 of FIG. 2.
Figure 3A:
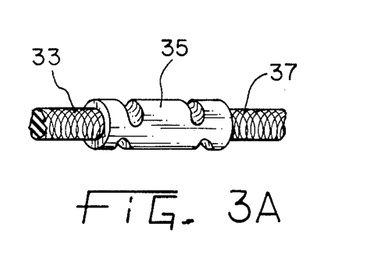
FIG. 3A is an enlarged view showing the ends of the elastic member connected together by means of a crimp connector.
Figure 5:
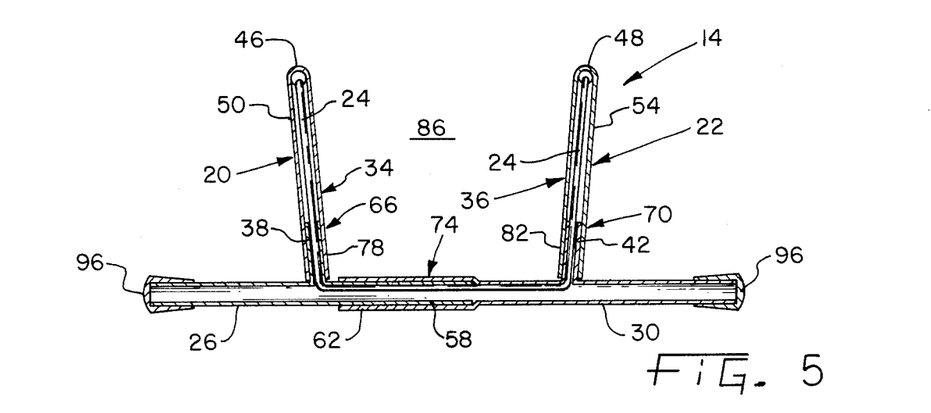
FIG. 5 is another sectional view of the rack taken along line 5—5 of FIG. 3.
Figure 6:
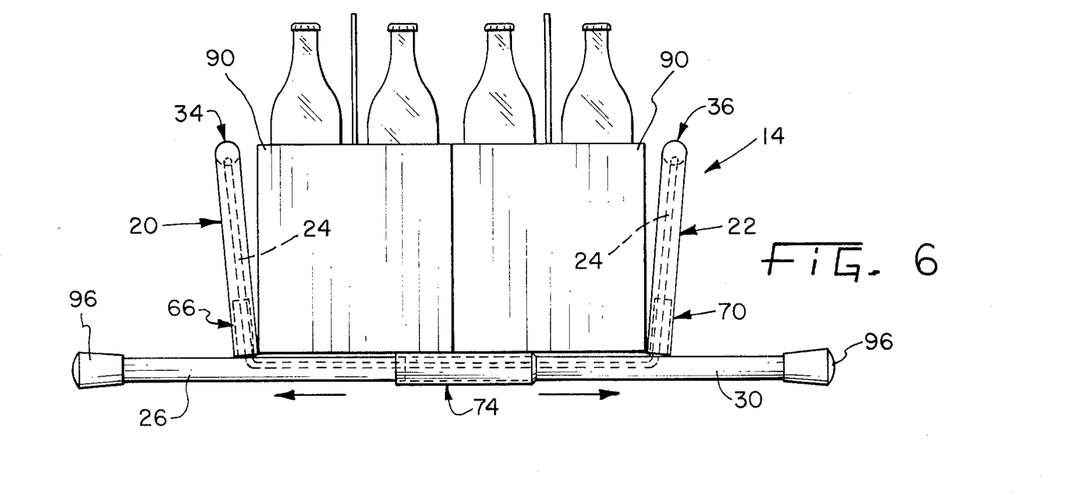
FIG. 6 is a side elevational view of the all-purpose rack illustrating another application of the rack similar to that of FIG. 1 but in which its mated opposite end parts are disposed in an expanded upright nonskewed configuration to hold two cartons of beverage containers in an upright position.

The respective end parts 20, 22 are thus substantially identical, except that their respective upright members 34, 36 are slightly inclined in opposite directions from the vertical such that they are displaced apart a greater distance between their respective upper ends than between their lower ends, as is readily apparent in FIGS. 2 and 5. Also, the adjacent ends 58, 60 and 62, 64 of the base members 26, 28 and 30, 32 of the end parts 20 and 22 have different diameters allowing the ends 58, 60 of base members 26, 28 to slidably fit telescopably into the ends 62, 64 of base members 30, 32.

The respective base and upright members 26-36 of the end parts 20, 22 have portions which form a plurality of slidable and pivotable joints 66-76 which couple the end parts 20, 22 and the members 26, 28, 34 and 30, 32, 36 thereof together in mated relationships. Specifically, the joints 66, 68 between the members of the one end part 20 and the joints 70, 72 between the members of the other end part 22 are formed by the cylindrical lower ends 78, 80 and 82, 84 of the upright members 34 and 36 which slidably telescope over the respective cylindrical short tubes 38, 40 and 42, 44 on base members 26, 28 and 30, 32. On the other hand, the joints 74 and 76 between the respective end parts 20, 22 are formed by the adjacent telescopable cylindrical inner ends 58, 60 and 62, 64 of base members 26, 28 and 30, 32.

Figure 9:
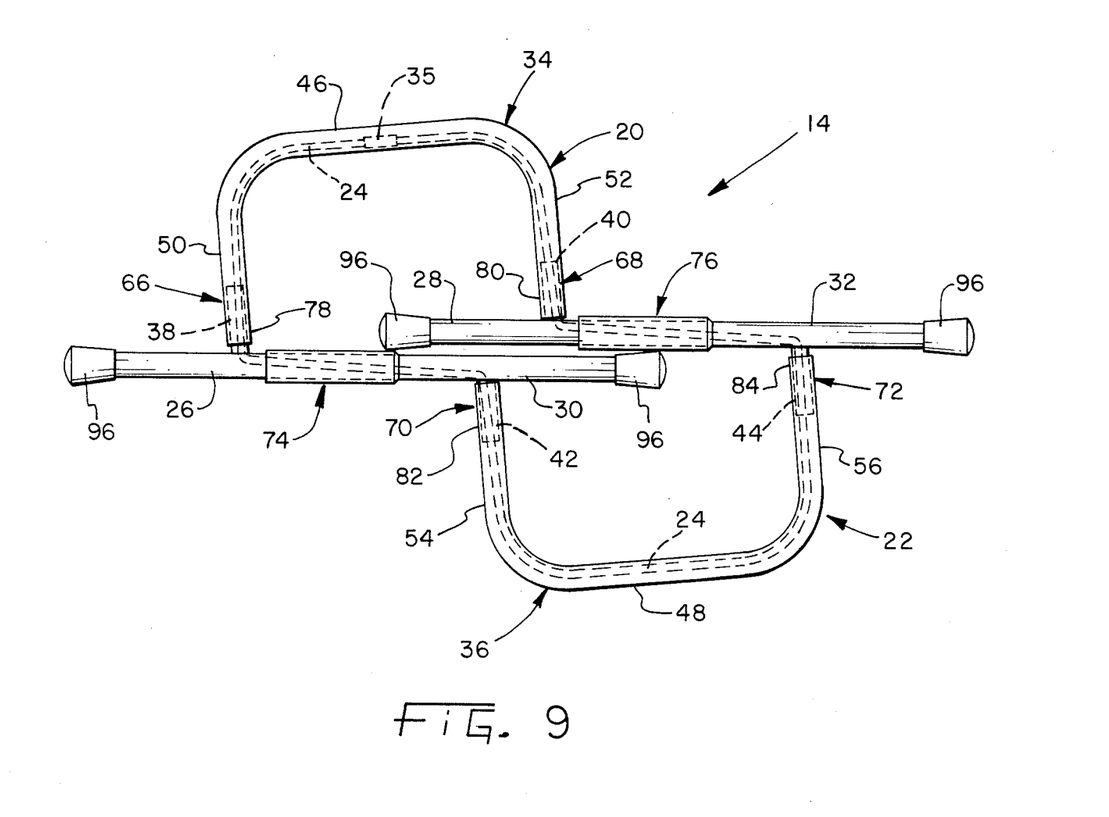
FIG. 9 is a plan view of the all-purpose rack converted to a folded, flattened configuration adapting it for storage when not in use, with the endless elongate elastic member contained within the multiple mated hollow tubular members of the rack end parts being shown in dashed outline form.

As seen in dashed outline form particularly in FIG. 9, the endless elongate elastic member 24 extends about an endless path within the hollow interior of the mated tubular base and upright members 26, 28, 34 and 30, 32, 36 of the mated end parts 20 and 22 so as to resiliently retain the end parts and the members thereof interconnected together while, at the same time, allowing the members to slide and pivot relative to one another at their mated joints 66-76. In such manner, an article holding region, generally designated as 86 in FIGS. 2 and 5, can be expanded and contracted in volume. The plurality of rack joints 66-76 formed by the mated tubular members 26-36 and yieldably held together by the endless elastic member 24 are telescopable slip joints which allow both relative pivoting and sliding movement between the members.

Figure 4:
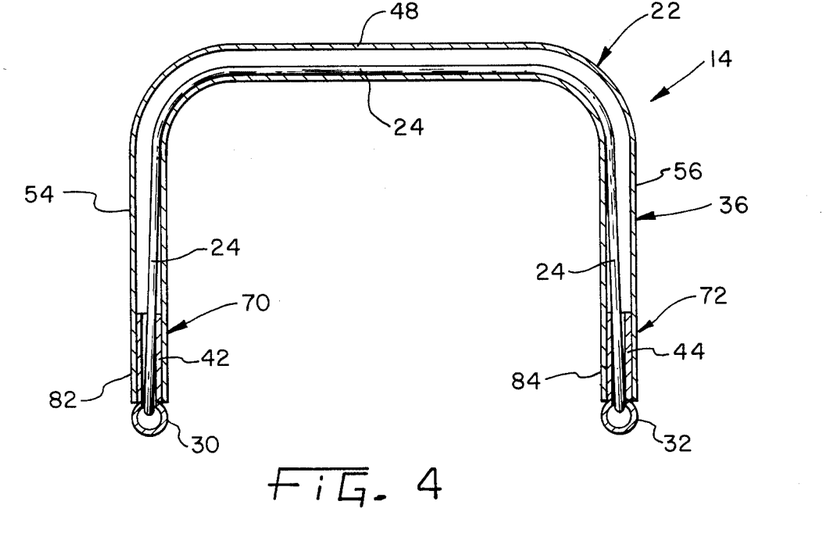
FIG. 4 is a sectional view of the rack taken along line 4—4 of FIG. 2.
Figures 7, 8:
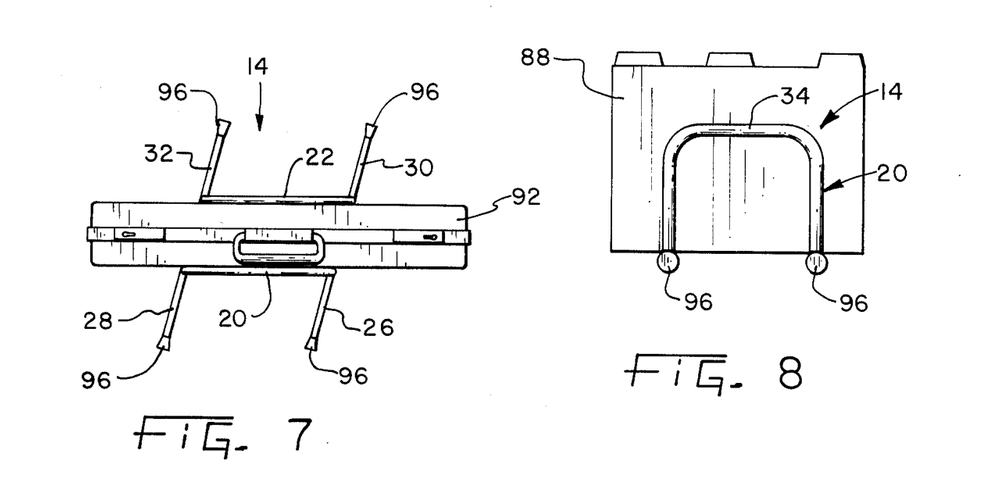
FIG. 7 is a top view of the all-purpose rack in yet another application wherein its mated opposite end parts are disposed in a retracted upright skewed configuration so as to hold a briefcase having a width smaller than the distance between rack end parts when in their retracted upright nonskewed configuration.
FIG. 8 is an end elevational view of the all-purpose rack illustrating an application of the rack as a file folder holder in which its mated opposite end parts are in a retracted upright nonskewed configuration substantially identical to that of FIG. 1.
Figures 11A, 11B, 11C:
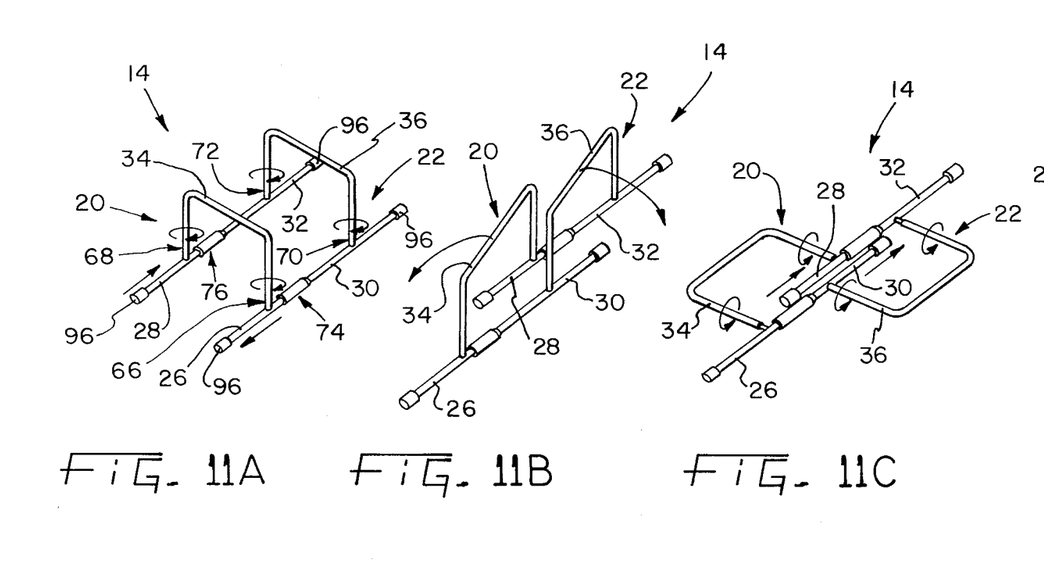
FIGS. 11A–11D are perspective views illustrating the steps in converting the all-purpose rack from its upright nonskewed configuration to an inverted nonskewed configuration.

The all-purpose rack 14 can be converted to any one of a plurality of different operative configurations adapting it to hold, in generally upright positions, different types of articles having diverse structures and shapes, such as depicted in FIGS. 1, 6-8 and 12-14. Before describing the steps of the method, it would be beneficial to define the meanings of the terms "skewed" and "nonskewed" as will be used herein. A "nonskewed" condition of the rack 14 exists when the mated base members 26-32 and the upright members 34, 36 of the mated end parts 20, 22 extend in generally orthogonal relationship to one another, as best seen in FIG. 11A. On the other hand, a "skewed" condition of the rack 14 exists when the upright members 34, 36 extends nonorthogonally with respect to the base members 26-32, as best seen in FIG. 11B. The respective different operative configurations that the rack 24 can assume and representative examples of the different types of articles that can be held by the rack in the different configurations are as follows: an upright nonskewed retracted configuration for holding the bag 18 of groceries, a carton, or multiple file folders 88, being shown respectively in FIGS. 1, 5 and 8; an upright nonskewed expanded configuration for holding cartons 90 of a beverage, being shown in FIG. 6; an upright skewed retracted configuration for holding a briefcase 92, being shown in FIG. 7; an inverted nonskewed retracted configuration for supporting a loudspeaker 94, being shown in FIG. 12; and another inverted nonskewed retracted configuration for supporting file folders 88, being shown in FIGS. 13 and 14. The rack can also be converted to a folded inoperative configuration, as seen in FIG. 9, for storing when not in use. As seen in FIGS. 2 and 4, the article holding region 86 of the rack 14 has a minimum set limit from which and back to which the rack can be expanded and contracted when in its nonskewed configuration. However, by skewing the rack 24, such as seen in FIG. 7, its capacity can be reduced below the set limit.

The method of converting the rack 14 in accordance with the present invention from its upright to inverted operative configuration is illustrated in FIGS. 11A-11D. To convert the all-purpose rack 14 from its upright operative configuration, seen in FIGS. 1, 2, 5 and 6 to inverted operative configuration, seen in FIGS. 12-14, its respective end parts 20, 22 are first pivotally moved from the upright nonskewed condition of FIG. 11A to the upright skewed condition of FIG. 11B. This is achieved by holding the rack 14 by its mated base members 26, 28 and 30, 32 and moving them in opposite directions, as depicted by the linear arrows located adjacent the base members in FIG. 11A. This causes relative pivoting between the base and upright members at the joints 66-72 and thus turning of the upright members in the directions of the circular arrows surrounding the upright members in FIG. 11A.

Next, from the upright skewed condition of FIG. 11B, the end parts 20 are pivotally moved to a flattened condition depicted in FIG. 11C where they both lie in a common plane. Parenthetically, it should be mentioned here that the flattened coplanar condition of the end parts 20, 22 which constitutes an intermediate step of the converting method also represents the folded inoperative configuration of the rack 14. Movement of the rack end parts 20, 22 to their flattened condition is achieved, once they are in the upright skewed condition of FIG. 11B, by merely pivoting the upright members 34, 36 in opposite directions, as indicated by the arcuate arrows in FIG. 11B, about the respective mated base members 26-32 as the latter are more or less held stationary. Once in the flattened condition, also seen in FIG. 9 as well as FIG. 11C, the rack 14 has no significant tendency irrespective of the presence of the elastic member 24 to spring away from such condition.

Figure 11D:
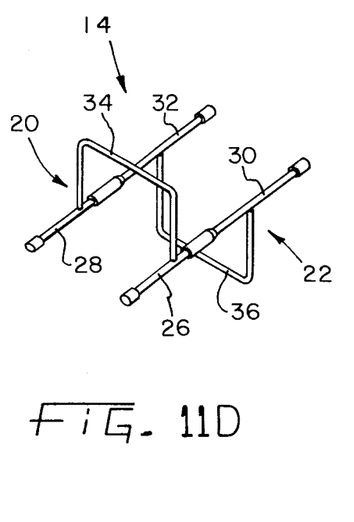
Figures 12, 13, 14:
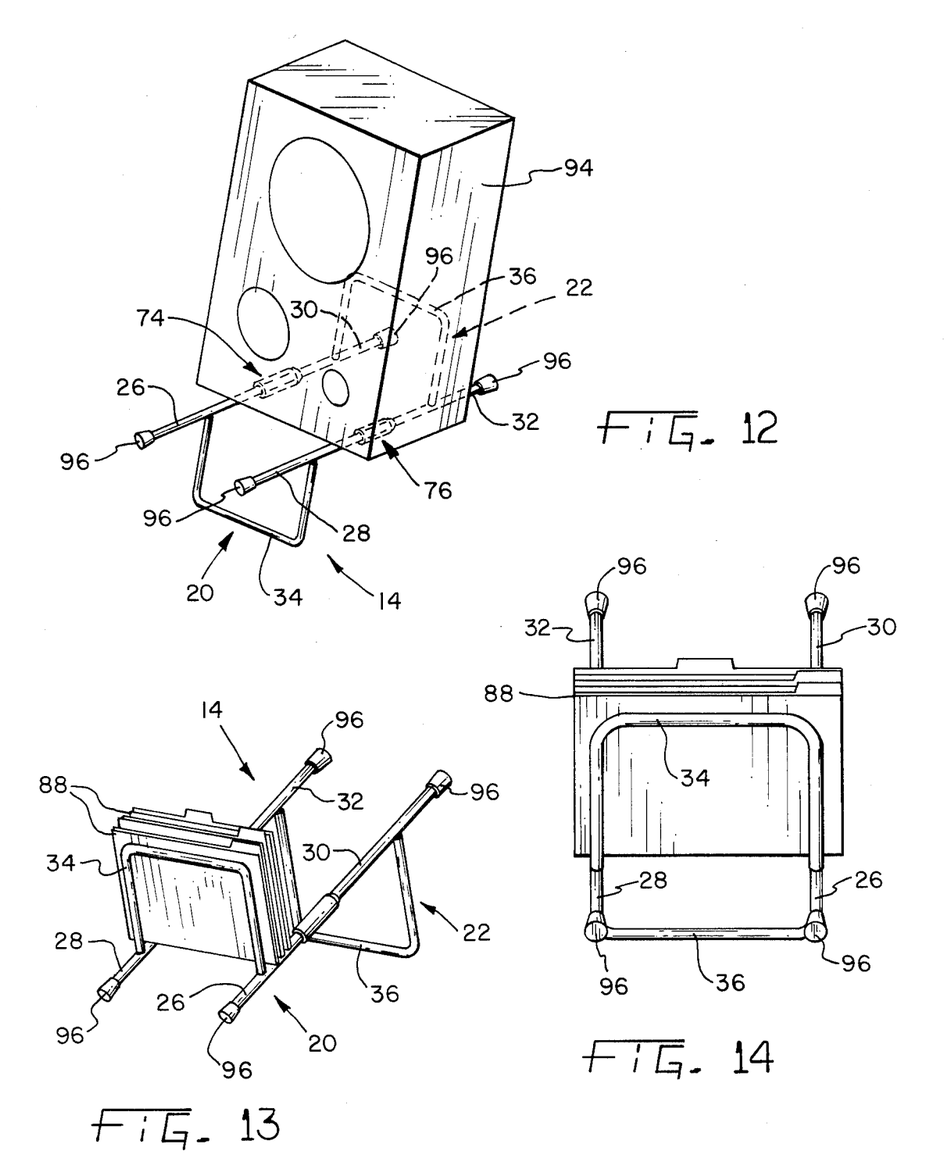
FIG. 12 is a perspective view of the all purpose rack in still another application in which its mated opposite end parts are disposed in an inverted nonskewed configuration so as to support a loud speaker in an inclined position.
FIG. 13 is a perspective view of the all-purpose rack in a further application in which its mated opposite end parts are disposed in a configuration similar to that of FIG. 12, but with a plurality of file folders being supported on the rack so as to display in unobstructed fashion the different labels on the folders.
FIG. 14 is an end view of the rack of FIG. 13.

Finally, the end parts 20, 22 are pivotally moved from the flattened coplanar condition of FIG. 11C to the nonskewed inverted condition of FIG. 11D. This is achieved by pivoting the upright members 34, 36, in the direction of the circular arrows surrounding them in FIG. 11C, at their respective joints 66-72 with the base members 26-32, while confining the mated base members to a parallel coplanar relationship with one another.

By merely reversing the above-described steps, the inverted configuration can be reconverted to the upright configuration. It will be realized that in each step of the converting method, the respective members of each end part 20, 22 move relative to one another through an arcuate path of approximately ninety degrees.

Figure 10:
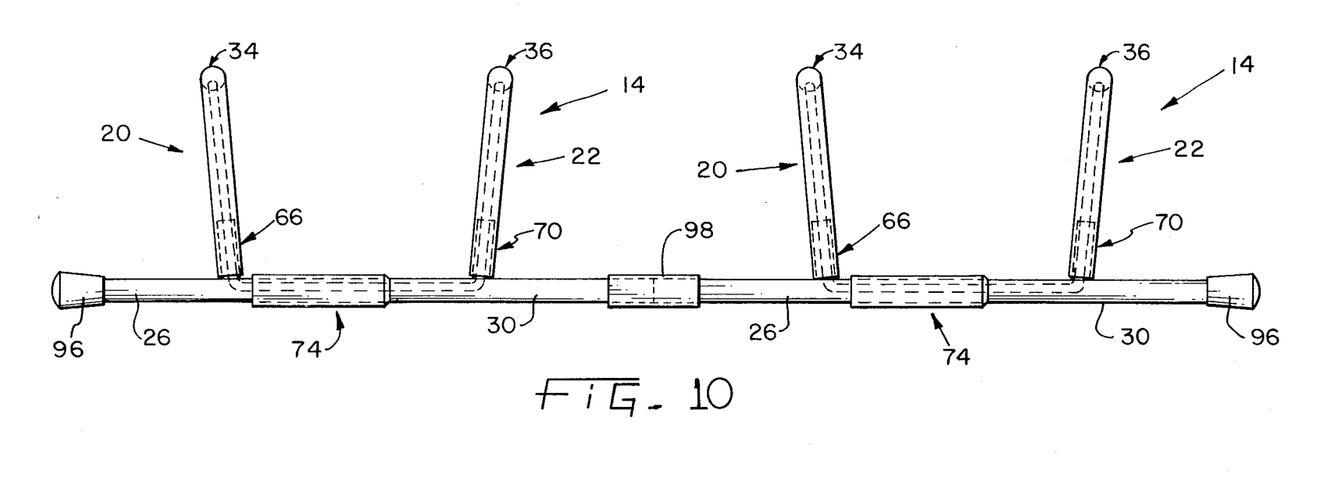
FIG. 10 is a side elevational view of a pair of the racks connected together in tandem relationship.

FIG. 10 shows a pair of racks 14 assembled together in a tandem relationship in addition to the respective end parts 20, 22 of each rack being disposed in side-by-side tandem relationship. Normally, the outer ends of the base members are covered by end caps 96, but in the assembled racks they are removed and replaced by couplers 98 on the adjacent ends of the racks.

Figure 15:
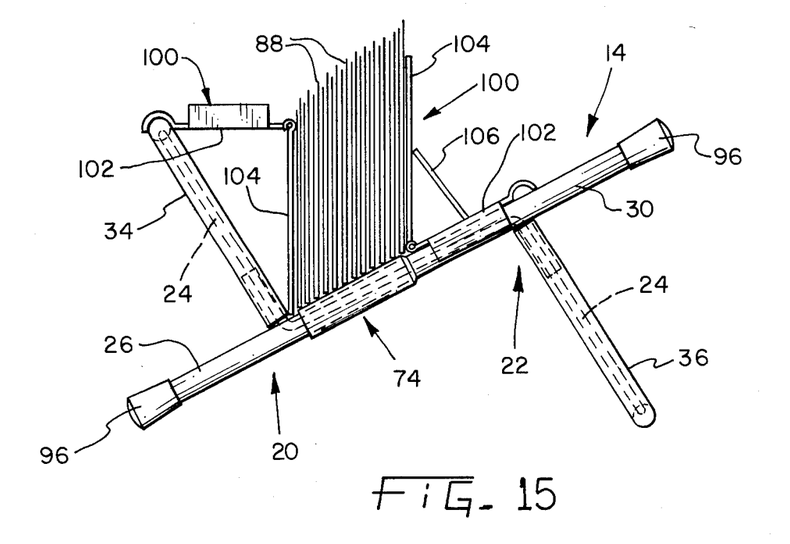
FIG. 15 is a side elevational view of the all-purpose rack supporting file folders but with hinged brackets applied to the rack so as to support the folders in vertical positions.
Figure 16:
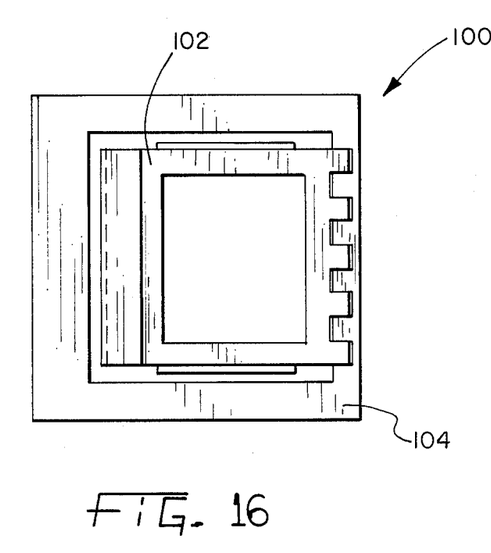
FIG. 16 is a plan view of one of the hinged brackets of FIG. 15.

FIG. 15 depicts a pair of collapsible hinged brackets 100 which can be attached to the base and upright members 26-36 of the rack 14 and extend into the article holding region 86 thereof to provide a means to hold file folders 88 in inclined vertical positions in which the labels of the individual folders are visible. Each bracket 100 has an attaching leg 102 and a positioning leg 104, being hinged together for pivoting through a limited angular displacement. A support brace 106 can be provided on the leg 104 so as to contact the attaching leg 102 to provide extra reinforcement for the positioning leg 104. In FIG. 16, one of the brackets 100 is shown in its flat condition for storage.

It is thought that the present invention and many of its attendant advantages will be understood from the foregoing description and it will be apparent that various changes may be made in the form, construction and arrangements of the parts thereof without departing from the spirit and scope of the invention or sacrificing all of its material advantages, the form hereinbefore described being merely a preferred or exemplary embodiment thereof.

What is claimed is:

1. An all-purpose rack for holding articles, comprising:
    a pair of mated opposite end parts each being composed of separate hollow tubular members including a base portion and a separate upstanding portion supported on said base portion, said members being connected together to form a plurality of slidable and pivotable joints coupling said respective end parts and said members of each said end part together in mated relationships with the upstanding portions being spaced apart so as to define an article holding region between said upstanding portions; and
    an elongate, endless, elastic loop member extending along a path within the hollow interior of said mated tubular members of said respective rack end parts so as to resiliently retain said upstanding and base portions interconnected together while allowing said members to slide and pivot relative to one another at their mated joints for expanding and contracting said article holding region of said rack and converting said rack to any one of a plurality of different operative configurations adapting said rack to hold articles having diverse shapes.

2. The rack as recited in claim 1, wherein one of said different operative configurations of said rack is an upright nonskewed retracted configuration wherein said upstanding portions extend from the same side of said base portions.

3. The rack as recited in claim 1, wherein one of said different operative configurations of said rack is an upright nonskewed expanded configuration wherein said upstanding portions extend from the same side of said base portions.

4. The rack as recited in claim 1, wherein one of said different operative configurations of said rack is an upright skewed retracted configuration wherein said upstanding portions extend from the same side of said base portions.

5. The rack as recited in claim 1, wherein one of said different operative configurations of said rack is an inverted nonskewed retracted configuration wherein said upstanding portions extend from opposite sides of said base portions.

6. The rack as recited in claim 1, wherein said elongate elastic member is endless and extends along an endless path defined by the hollow interior of said mated tubular members.

7. The rack as recited in claim 1, wherein said elastic member and said slidable and pivotable joints allow said rack to be converted to a folded inoperative position for storing said rack when not in use.

8. The rack as recited in claim 1, wherein said plurality of joints formed by said mated tubular member portions and held together by said endless elastic member are telescopic slip joint means which allow both relative sliding and pivoting movement between said members.

9. The rack as recited in claim 1, wherein said base portions of each end part include a pair of tubular base members and said upstanding portion comprises a U-shaped tubular upright member supported on the said base members intermediate their respective opposite ends so as to dispose said base members in generally parallel, laterally spaced apart relationship.

10. The rack as recited in claim 9, wherein each of said base members has a generally linear shape, whereas said upright member is generally inverted U-shaped.

11. The rack as recited in claim 9, wherein said upright member is composed of a tubular end portion and a pair of tubular side portions integrally connected to, and extending generally parallel to one another in a common direction from, respective opposite ends of said end portion.

12. An all-purpose rack for holding articles, comprising:
    a pair of mated opposite end parts each being composed of a pair of hollow tubular base members and a hollow tubular upright member supported on said base members so as to space said base members apart and extend in generally orthogonal relationship thereto, said base and upright members having portions which form a plurality of slidable and pivotable joints coupling said respective end parts and said members of each said end part together in mated relationship, said upright members being spaced apart so as to define an article holding region between said upright members; and
    an elongate, endless elastic loop member extending along a path defined by the hollow interior of said mated tubular base and upright members of said respective rack end parts so as to resiliently retain said upstanding and base members interconnected together while allowing said members to slide and pivot relative to one another at their mated joints for placing said rack in an upright operative configuration in which said end parts thereof are disposed in a side-by-side tandem arrangement with their respective base members extending in a common plane and their respective upright members extending in the same direction relative to their respective base members.

13. An all-purpose rack for holding articles, comprising:
    a pair of mated opposite end parts each being composed of a pair of hollow tubular base members and a hollow tubular upright member supported on said base members so as to space said base members apart and extend in generally orthogonal relationship thereto, said members having portions which form a plurality of slidable and pivotable joints coupling said respective end parts and said members of each said end part together in mated relationships so as to define an article holding region between said base and one of said upright members; and an endless elongate elastic loop member extending along an endless path defined within the hollow interior of said mated tubular members of said respective rack end parts so as to resiliently retain said base and upstanding members interconnected together while allowing said members to slide and pivot relative to one another at their mated joints for placing said rack in an inverted operative configuration in which said end parts thereof are disposed in a side-by-side tandem arrangement with their respective base members extending a common plane and their respective upright members extending in the opposite directions relative to their respective base members such that articles being disposed in said article holding region are held in a generally upright inclined position.

14. The rack as recited in claim 13, further comprising:
a pair of brackets attached on said end parts and extending within said article holding region for disposing articles being held in said region in a generally vertical orientation.

15. A method of converting an article-holding rack from an upright to inverted operative configuration, comprising the steps of:
moving a pair of end parts of said rack, being interconnected together in mated relationship by pivotable joints, from an upright nonskewed to upright skewed condition;
moving said mated end parts from said upright skewed to a flattened condition wherein said mated end parts both lie in a common plane; and
moving said mated end parts from said flattened coplanar to a nonskewed inverted condition.

16. A method of converting an article-holding rack from an upright operative to folded inoperative configuration, comprising the steps of:
pivotally moving a pair of mated end parts of said rack, being composed of separate hollow tubular members interconnected together in mated relationship by pivotable joints and a tensioned endless elongated elastic member extending along an endless path through the hollow interior of said mated members, from an upright nonskewed to upright skewed condition; and
pivotally moving said mated end parts from said upright skewed to a flattened condition wherein said mated end parts both lie in a common plane and assume said folded inoperative configuration.

17. A method of converting an article-holding rack from an inverted operative to folded inoperative configuration, comprising the steps of:
pivotally moving a pair of mated end parts of said rack, being composed of separate hollow tubular members interconnected together in mated relationship by pivotable joints and an endless elongated elastic member extending along an endless path through the hollow interior of said mated members, from an inverted nonskewed to an inverted skewed condition; and
pivotally moving said mated end parts from said inverted skewed to a flattened condition wherein said mated end parts both lie in a common plane and assume said folded inoperative configuration.

18. A method of converting an article-holding rack from an upright to inverted operative configuration, comprising the steps of:
(a) moving a pair of mated end parts of said rack, being composed of separate hollow tubular members interconnected together in mated relationship by pivotable joints and an endless elongated elastic member extending along an endless path through the hollow interior of said mated members, from an upright nonskewed to upright skewed condition;
(b) moving said mated end parts from said upright skewed to a flattened condition wherein said mated end parts both lie in a common plane; and
(c) moving said mated end parts from said flattened coplanar to a nonskewed inverted condition.

19. The method as recited in claim 18, wherein said respective members of each end part pivotally move relative to one another through an arcuate path of approximately ninety degrees in each of steps (a), (b) and (c) of the converting method.

20. The method as recited in claim 18, wherein said flattened coplanar condition of said end parts represents a folded inoperative configuration of said rack.

21. An all-purpose rack assembly for holding different articles, comprising:
a first rack; and
a second rack;
each of said racks including a pair of mated opposite end parts each being composed of separate hollow tubular members having portions which form a plurality of slidable and pivotable joints coupling said respective end parts and said members of each said end part together in mated relationships so as to define an article holding region between the end parts in each rack, and a separte endless elongated elastic member associated with each rack extending along an endless path defined within the hollow interior of said mated tubular members of said respective end parts of said each rack so as to resiliently retain said parts interconnected together while allowing said members to slide and pivot relative to one another at their mated joints for expanding and contracting said article holding region of said respective rack and converting said rack to any one of a plurality of different operative configurations adapting said rack to hold articles having diverse structures and shapes;
said racks being secured together in a side-by-side tandem relationship at an end of one end part of each respective rack.

* * * * *

UNITED STATES PATENT AND TRADEMARK OFFICE
CERTIFICATE OF CORRECTION

PATENT NO. : 4,746,041
DATED : May 24, 1988
INVENTOR(S) : Lynn R. Cook et al

It is certified that error appears in the above-identified patent and that said Letters Patent is hereby corrected as shown below:

Claim 21, Col. 10, line 44, change "separte" to --separate--.

Signed and Sealed this

Twenty-fifth Day of October, 1988

*Attest:*

DONALD J. QUIGG

*Attesting Officer*  *Commissioner of Patents and Trademarks*